United States Patent
Zheng et al.

(10) Patent No.: US 9,626,999 B1
(45) Date of Patent: Apr. 18, 2017

(54) SYSTEMS AND METHODS FOR REAL TIME ITI COMPENSATION IN A MULTI-DIMENSIONAL EQUALIZER

(71) Applicant: Avago Technologies General IP (Singapore) Pte. Ltd., Singapore (SG)

(72) Inventors: Yu Zheng, Santa Clara, CA (US); Richard Rauschmayer, Longmont, CO (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/974,985

(22) Filed: Dec. 18, 2015

(51) Int. Cl.
*G11B 20/10* (2006.01)

(52) U.S. Cl.
CPC ................. *G11B 20/10212* (2013.01)

(58) Field of Classification Search
None
See application file for complete search history.

(56) References Cited

U.S. PATENT DOCUMENTS

| | | | | |
|---|---|---|---|---|
| 5,361,174 A | * | 11/1994 | Seki | G11B 20/10009 360/46 |
| 5,991,108 A | * | 11/1999 | Ohta | G11B 20/10009 360/31 |
| 6,678,230 B2 | * | 1/2004 | Miyashita | G11B 20/10009 360/65 |
| 6,836,457 B2 | * | 12/2004 | Nakamura | G11B 20/10009 360/65 |
| 8,848,776 B1 | | 9/2014 | Wilson | |
| 9,025,267 B1 | | 5/2015 | Wang | |
| 9,147,419 B2 | | 9/2015 | Oberg | |
| 2005/0259551 A1 | * | 11/2005 | Kudo | G11B 7/0903 369/59.22 |
| 2012/0063284 A1 | * | 3/2012 | Mathew | G11B 20/10046 369/53.44 |
| 2014/0233129 A1 | * | 8/2014 | Xiao | G11B 20/10046 360/39 |
| 2014/0285915 A1 | * | 9/2014 | Maeto | G11B 20/10046 360/40 |

* cited by examiner

Primary Examiner — Peter Vincent Agustin
(74) Attorney, Agent, or Firm — Sheridan Ross P.C.

(57) ABSTRACT

Systems and methods relating generally to data storage, and more particularly to systems and methods for accessing and storing information using multiple sensors.

20 Claims, 6 Drawing Sheets

SYSTEMS AND METHODS FOR REAL TIME ITI COMPENSATION IN A MULTI-DIMENSIONAL EQUALIZER

FIELD OF THE INVENTION

Systems and methods relating generally to data storage, and more particularly to systems and methods for accessing and storing information using multiple sensors.

BACKGROUND

Reading and writing data to/from a storage medium may include positioning a read/write head assembly over a track of a storage medium. Where the read/write head is not centered in a cross track direction (i.e., orthogonally from adjacent track to adjacent track) over the track when either a read or a write is performed, data sensed by a read head exhibits a reduced signal to noise ratio and/or a change in interference from an adjacent track. Mis-positioning in the cross track direction is commonly referred to as track mis-registration. Track mis-registration reduces an ability to recover data previously stored to a storage medium.

Hence, for at least the aforementioned reasons, there exists a need in the art for advanced systems and methods for adjusting for track mis-registration.

SUMMARY

Systems and methods relating generally to data storage, and more particularly to systems and methods for accessing and storing information using multiple sensors.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phases do not necessarily refer to the same embodiment. Many other embodiments of the invention will become more fully apparent from the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF SOME EMBODIMENTS

Systems and methods relating generally to data storage, and more particularly to systems and methods for accessing and storing information using multiple sensors.

Figure 1:
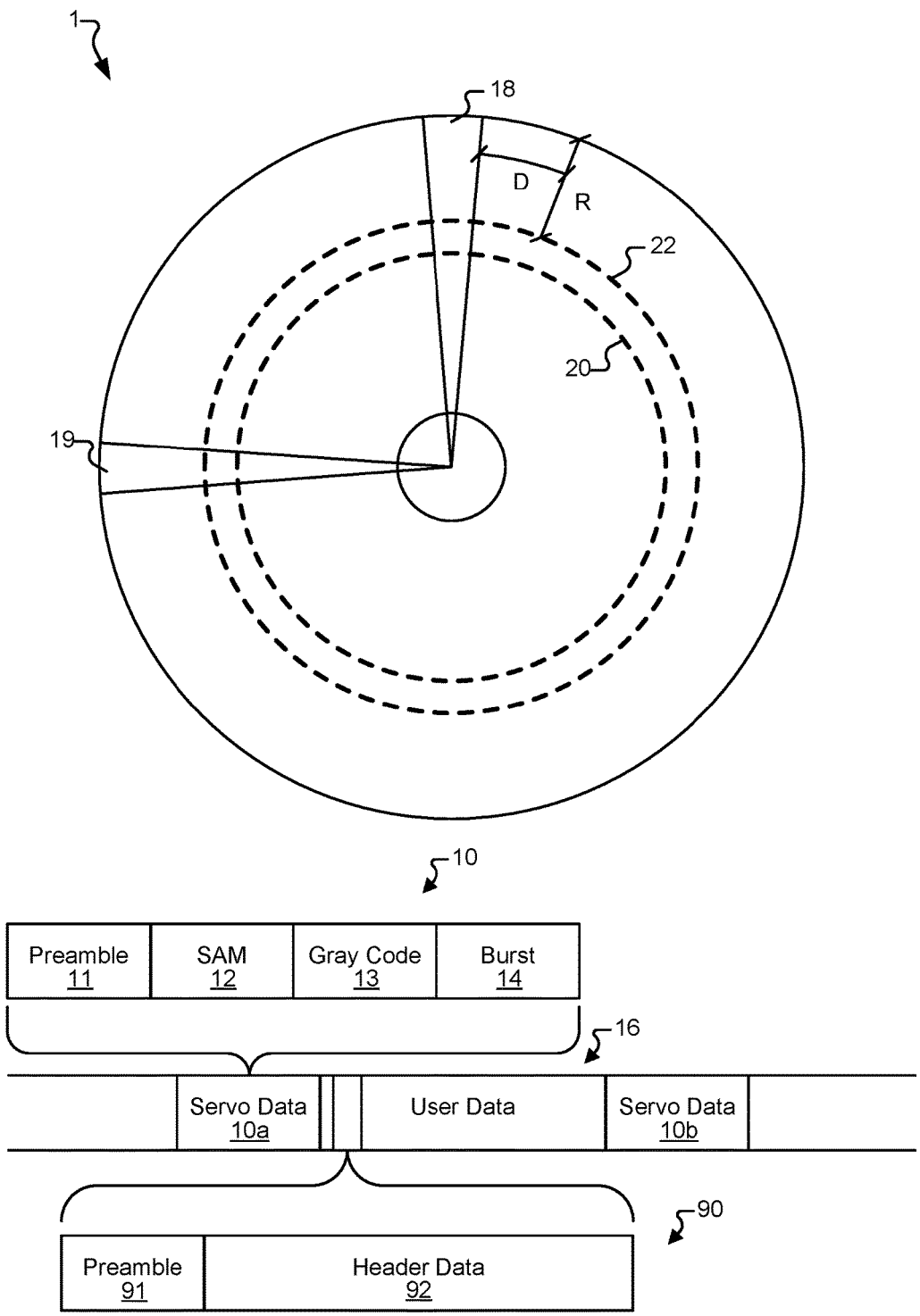
FIG. 1 is a block diagram of a known magnetic storage medium and sector data scheme.

Turning to FIG. 1, a storage medium 1 is shown with two exemplary tracks 20, 22 indicated as dashed lines. The tracks are divided into sectors by servo data written within wedges 19, 18. These wedges include servo data 10 that is used for control and synchronization of a read/write head assembly over a desired location on storage medium 1. In particular, this servo data generally includes a preamble pattern 11 followed by a sector address mark 12 (SAM). Sector address mark 12 may include wedge identification information followed by the SAM. Sector address mark 12 is followed by a Gray code 13, and Gray code 13 is followed by burst information 14. Gray code 13 may include track identification information. It should be noted that while two tracks and two wedges are shown, hundreds of each (or more) would typically be included on a given storage medium. Further, it should be noted that a servo data set may have two or more fields of burst information. Yet further, it should be noted that different information may be included in the servo fields such as, for example, repeatable run-out information that may appear after burst information 14.

Between the servo data bit patterns 10a and 10b, a user data region 16 is provided. User data region 16 includes some synchronization and header data 90 that includes a preamble pattern 91 and a head data 92 followed by user data within user data region 16. Based upon the disclosure provided herein, one of ordinary skill in the art will recognize a variety of data that may be included in header data 92.

In operation, storage medium 1 is rotated in relation to a sensor that senses information from the storage medium. In a read operation, the sensor would sense servo data from wedge 19 (i.e., during a servo data period) followed by user data from a user data region between wedge 19 and wedge 18 (i.e., during a user data period) and then servo data from wedge 18. When reading data in user data region 16, synchronization to the data is done through use of preamble 91. In a write operation, the sensor would sense servo data from wedge 19 then write data to the user data region between wedge 19 and wedge 18. Then, the sensor would be switched to sense a remaining portion of the user data region followed by the servo data from wedge 18. Of note, wedges 18, 19 follow arcs corresponding to the geometry of an arm and pivot as is known in the art.

Various embodiments provide storage devices that include: a storage medium including at least a target track disposed by an adjacent track; a read/write head assembly disposed relative to the storage medium, where the read/write head assembly includes at least a first read sensor and a second read sensor; and an equalization circuit. The equalization circuit includes: a first equalizer circuit operable to equalize a first data set derived from the first read head sensing information from the target track based upon a first coefficient set; a second equalizer circuit operable to equalize a second data set derived from the second read head sensing information from the target track based upon a second coefficient set; and an inter-track interference compensation circuit operable to update the first coefficient set and the second coefficient set to mitigate inter-track interference from the adjacent track.

In some instances of the aforementioned embodiments, the equalization circuit further includes a main head selection circuit operable to identify one of the first read head or the second read head as closer to a centerline of the target track. The inter-track interference compensation circuit is operable to update the first coefficient set using a first update algorithm and update the second coefficient set using a second update algorithm. The first update algorithm is different from the second update algorithm and is selected based upon a determination that the first read head is closer to the centerline of the target track. In various instances of the aforementioned embodiments, the inter-track compensation circuit is further operable to calculate a mitigation value, where both the first update algorithm and the second update algorithm use the mitigation value. In particular instances of the aforementioned embodiments, the inter-track interference compensation circuit is further operable to determine a scalar applicable to the mitigation value.

Other embodiments provide equalization systems that include: a first equalizer circuit operable to equalize based upon a first coefficient set a first data set derived from a first read head sensing information from a target track, where the target track is near an adjacent track; a second equalizer circuit operable to equalize based upon a second coefficient set a second data set derived from a second read head sensing information from the target track; and an inter-track interference compensation circuit operable to update the first coefficient set and the second coefficient set to mitigate inter-track interference from the adjacent track. In some instances, the systems are implemented as part of an integrated circuit.

Yet other embodiments provide methods for mitigating inter-track interference. The methods include: applying a first equalization by a first equalization circuit using a first coefficient set to a first data set derived from a first read head sensing information from a target track to yield a first equalized output, where the target track is near an adjacent track; applying a second equalization by a second equalization circuit using a second coefficient set to a second data set derived from a second read head sensing information from the target track to yield a second equalized output; identifying one of the first read head or the second read head as closer to a centerline of the target track; and updating the first coefficient set and the second coefficient set to mitigate inter-track interference from the adjacent track. Updating the first coefficient set is done in accordance with a first update algorithm and updating the second coefficient set is done in accordance with a second update algorithm. The first update algorithm is different from the second update algorithm and is selected based upon a determination that the first read head is closer to the centerline of the target track. In some instances, the methods further include calculating a mitigation value where both the first update algorithm and the second update algorithm use the mitigation value.

Figure 2:
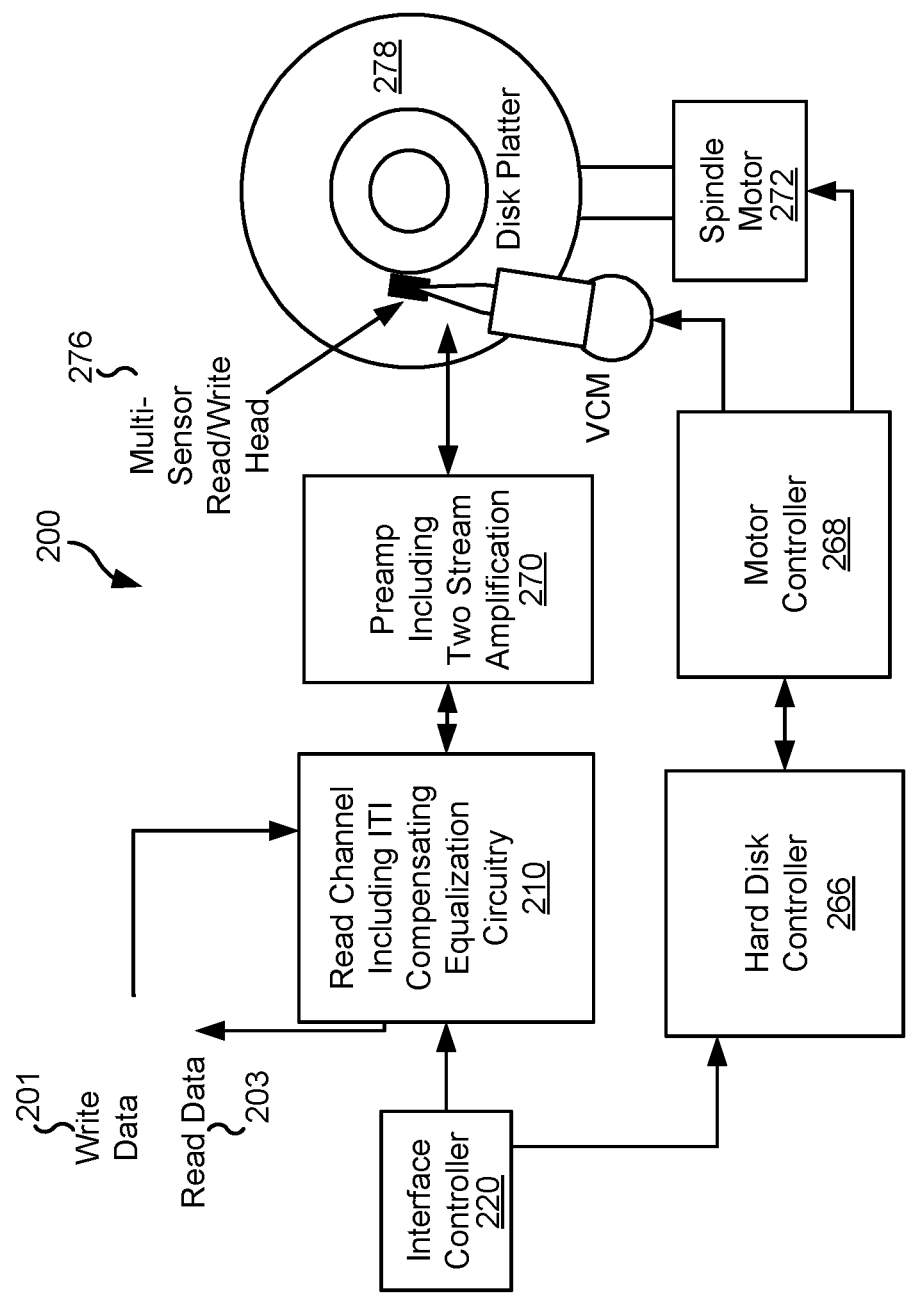
FIG. 2 shows a storage system that includes a read channel having inter-track interference (ITI) compensating equalization circuitry in accordance with various embodiments of the present inventions.

Turning to FIG. 2, a storage system 200 is shown that includes a read channel 210 having ITT compensating equalization circuitry in accordance with various embodiments of the present invention. Storage system 200 may be, for example, a hard disk drive. Storage system 200 also includes an interface controller 220, a hard disk controller 266, a motor controller 268, a spindle motor 272, and a disk platter 278. A multi-sensor read/write head 276 includes at least two read heads distributed at different locations along the read/write head. In some cases, multi-sensor read/write head 276 may be disposed in relation to disk platter 278 such that all of the sensors are disposed at least partially over the same track. In other cases, multi-sensor read/write head 276 may be disposed in relation to disk platter 278 such that one or more sensors are disposed over different tracks of disk platter 278.

Interface controller 220 controls addressing and timing of data to/from disk platter 278, and interacts with a host controller (not shown). The data on disk platter 278 consists of groups of magnetic signals that may be detected by read/write head assembly 276 when the assembly is properly positioned over disk platter 278. In one embodiment, disk platter 278 includes magnetic signals recorded in accordance with either a longitudinal or a perpendicular recording scheme.

In a typical read operation, multi-sensor read/write head 276 is accurately positioned by motor controller 268 over a desired data track on disk platter 278. Motor controller 268 both positions multi-sensor read/write head 276 in relation to disk platter 278 and drives spindle motor 272 by moving read/write head assembly 276 to the proper data track on disk platter 278 under the direction of hard disk controller 266. Spindle motor 272 spins disk platter 278 at a determined spin rate (RPMs). Once multi-sensor read/write head 276 is positioned adjacent the proper data track, magnetic signals representing data on disk platter 278 are sensed by each of the sensors included in multi-sensor read/write head 276 as disk platter 278 is rotated by spindle motor 272. The sensed magnetic signals are provided as a continuous, minute analog signal representative of the magnetic data on disk platter 278 with a signal stream being provided from each of the multiple sensors. These minute analog signals are transferred from multi-sensor read/write head 276 to read channel circuit 210 via preamplifier 270. Preamplifier 270 is operable to amplify the respective minute analog signals accessed from disk platter 278. In turn, read channel circuit 210 processes the multiple amplified signals including combining the signals and applying data processing including, but not limited to, detection and/or decoding to the combined signals to recreate the information originally written to disk platter 278. This data are provided as read data 203 to a receiving circuit. A write operation is substantially the opposite of the preceding read operation with write data 201 being provided to read channel circuit 210. This data are then encoded and written to disk platter 278.

The processing applied to the multiple signal sets derived from the respective read heads included in multi-sensor read/write head 276 involves aligning data derived from the respective read heads before combining the data into a stream for processing by data decoder and data detection circuitry. This combination of data from the respective read heads includes compensating for inter-track interference (ITI). The compensation process includes updating coefficients used for equalizer circuits associated with data from the respective read heads. By updating the coefficients, ITI is compensated. Such processing including ITI compensation may be done using circuitry similar to that included in FIG. 3a discussed below, and/or in accordance with one of the methods discussed below in relation to FIGS. 4-5.

It should be noted that storage system 200 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 200, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 210 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 200 may be modified to include solid state memory that is used to store data in addition to the storage offered by disk platter 278. This solid state memory may be used in parallel to disk platter 278 to provide additional storage. In such a case, the solid state memory receives and provides information directly to read channel circuit 210. Alternatively, the solid state memory may be used as a cache where it offers faster access time than that offered by disk platted 278. In such a case, the solid state memory may be disposed between interface controller 220 and read channel circuit 210 where it operates as a pass through to disk platter 278 when requested data is not available in the solid state memory or when the solid state memory does not have sufficient storage to hold a newly written data set. Based upon the disclosure provided herein, one of ordinary skill in the art will recognize a variety of storage systems including both disk platter 278 and a solid state memory.

Figure 3A:
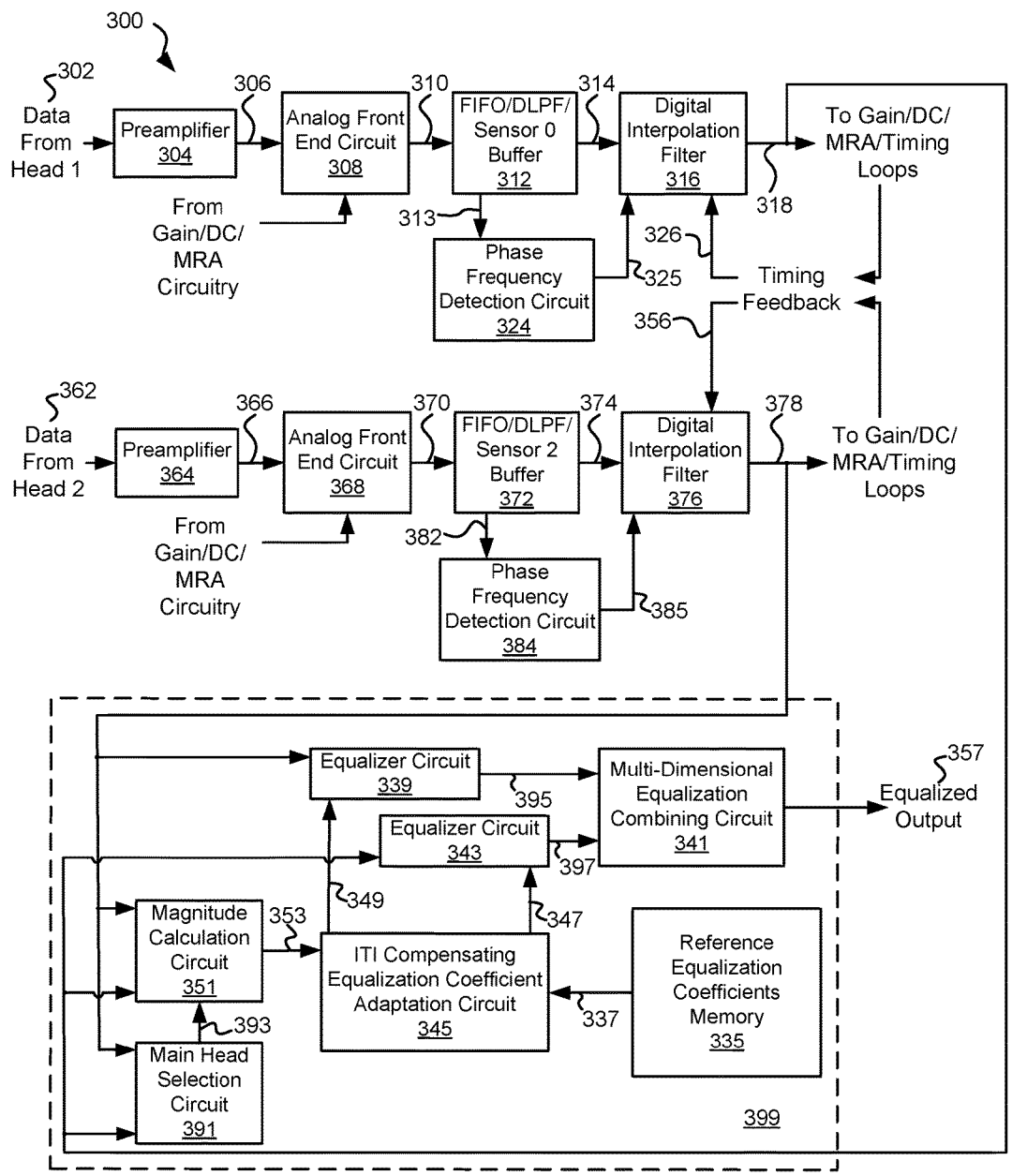
FIG. 3a is a processing circuit able to accept inputs from two distinct read heads and to apply ITI compensating equalization in accordance with one or more embodiments of the present inventions.

Turning to FIG. 3a, a processing circuit 300 able to accept inputs from two distinct read heads that may be incorporated in the same read/write head assembly and to apply ITI compensating equalization is shown in accordance with one or more embodiments of the present invention. Processing circuit 300 includes a preamplifier circuit 304 that receives data 302 from one sensor (i.e., head 1 or HD1) of a multi-sensor read/write head (not shown). Data 302 is received as an analog signal derived from sensing information from a track on the storage medium (not shown). Preamplifier circuit 304 amplifies data 302 to yield an amplified signal 306 that is provided to an analog front end circuit 308. Analog front end circuit 308 processes amplified signal 306 to yield a series of digital samples 310. Analog front end circuit 308 may include, but is not limited to, an analog filter, a variable gain amplifier circuit in part governed by a gain input from gain, DC offset, and magneto resistive asymmetry (MRA) modification circuitry (not shown), a DC offset adjustment in part governed by the gain, DC offset, and magneto resistive asymmetry (MRA) modification circuitry, and magneto resistive asymmetry mitigation in part governed by a gain input from gain, and an analog to digital converter circuit as are known in the art. Based upon the disclosure provided herein, one of ordinary skill in the art will recognize a variety of circuitry that may be included as part of analog front end circuit 308.

Digital samples 310 are provided to a filter and buffer circuit 312 that applies digital low pass filtering to digital samples 310 and stores the filtered data to a memory buffer. As digital samples are received, a first in first out (FIFO) memory receives the samples. An offset into the FIFO memory accounts the physical offsets in a down-track direction between sensors on the multi-sensor read/write head. As data are pulled from the FIFO memory of filter and buffer circuit 312 the digital samples are filtered and stored to a memory buffer as filtered data 314. A digital interpolation filter 316 interpolates filtered data 314 to correct any phase offset errors identified during tracking mode. The interpolation is done based upon a timing feedback 326 from a timing update loop circuit (not shown) which utilizes feedback based upon all of the sensors from the multi-sensor read/write head to identify an adjustment for each of the data streams from the respective sensors. The resulting aligned data 318 is provided to gain, DC offset, magneto resistive asymmetry (MRA) modification circuitry, and timing loops (not shown). This modification circuitry is operable to modify a DC offset, variable gain, and magneto resistive asymmetry mitigation applied by analog front end circuit 308. Any gain, DC offset, and magneto resistive asymmetry (MRA) modification circuitry known in the art may be used in relation to different embodiments of the present invention. In addition, the timing loops generate timing feedback 326 that is used to control digital interpolation filter 316.

Further, digital samples are accessed from the memory buffer as filtered data 312 by a phase/frequency detection circuit 324. Upon receiving a complete preamble for a given user data set (e.g., preamble 91 of FIG. 1), phase frequency detection circuit 324 calculates a phase adjustment 325 which is to be applied to all user data maintained in the memory buffer of filter and buffer circuit 312 by a digital interpolation filter 316. Phase adjustment 325 is calculated to align the received data with a better sample point which makes the retrieved data more easily discerned by a downstream data decoder circuit. The phase adjustment is calculated differently depending upon whether the processing is in acquisition mode (i.e., the processing of header data associated with a user data set) or tracking mode (i.e., the processing of user data in the data set that follows the header data).

Additionally, processing circuit 300 includes a preamplifier circuit 364 that receives data 362 from another sensor (i.e., head 2 or HD2) of the multi-sensor read/write head.

Data 362 is received as an analog signal derived from sensing information from a track on the storage medium. Preamplifier circuit 364 amplifies data 362 to yield an amplified signal 366 that is provided to an analog front end circuit 368. Analog front end circuit 368 processes amplified signal 366 to yield a series of digital samples 370. Analog front end circuit 368 may include, but is not limited to, an analog filter, a variable gain amplifier circuit in part governed by a gain input from gain, DC offset, and magneto resistive asymmetry (MRA) modification circuitry.

Digital samples 370 are provided to a filter and buffer circuit 372 that applies digital low pass filtering to digital samples 370 and stores the filtered data to a memory buffer. As digital samples are received, a first in first out (FIFO) memory receives the samples. An offset into the FIFO memory accounts the physical offsets between sensors on the multi-sensor read/write head. As data are pulled from the FIFO memory of filter and buffer circuit 372 the digital samples are filtered and stored to a memory buffer as filtered data 374.

Digital samples are accessed from the memory buffer as filtered data 382 by a phase/frequency detection circuit 384. Upon receiving a complete preamble for a given user data set (e.g., preamble 91 of FIG. 1), phase frequency detection circuit 384 calculates a phase adjustment 385 which is to be applied to all user data maintained in the memory buffer of filter and buffer circuit 372 by a digital interpolation filter 376. Phase adjustment 385 is calculated to align the received data with a better sample point which makes the retrieved data more easily discerned by a downstream data decoder circuit. The phase adjustment is calculated differently depending upon whether the processing is in acquisition mode (i.e., the processing of header data associated with a user data set) or tracking mode (i.e., the processing of user data in the data set that follows the header data).

The filtered data is also accessed from filter and buffer circuit 372 as filtered data 374. A digital interpolation filter 376 interpolates filtered data 374 to correct any phase offset errors identified during tracking mode. The interpolation is done based upon a timing feedback 356 from a timing update loop circuit (not shown) which utilizes feedback based upon all of the sensors from the multi-sensor read/write head to identify an adjustment for each of the data streams from the respective sensors. The resulting aligned data 378 is provided to gain, DC offset, magneto resistive asymmetry (MRA) modification circuitry, and timing loops (not shown). This modification circuitry is operable to modify a DC offset, variable gain, and magneto resistive asymmetry mitigation applied by analog front end circuit 368. Any gain, DC offset, and magneto resistive asymmetry (MRA) modification circuitry known in the art may be used in relation to different embodiments of the present invention. In addition, the timing loops generate timing feedback 356 that is used to control digital interpolation filter 376.

Figure 3B:
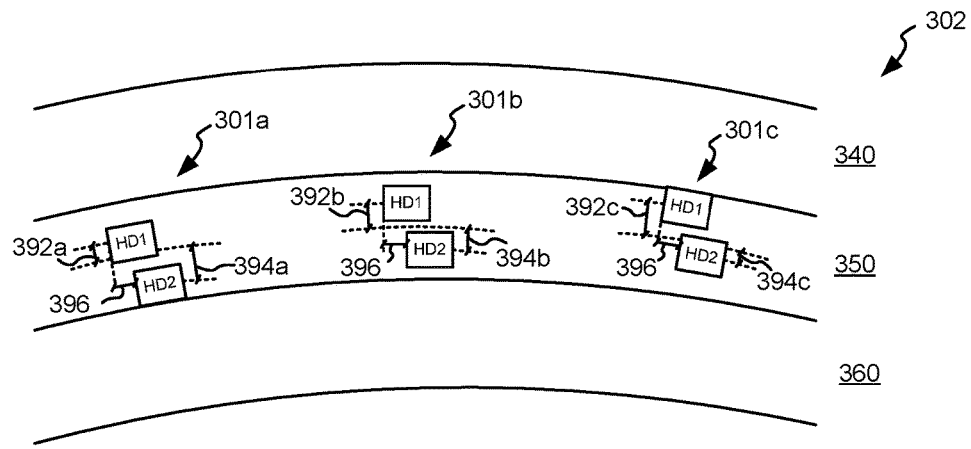
FIGS. 3b-3c are diagrams showing of multiple tracks of a storage medium traversed by two read heads, and each of the tracks including alternating preambles as part of a user data region in accordance with various embodiments of the present inventions.

Turning to FIG. 3b, a diagram 302 shows three tracks 340, 350, 360 on a storage medium. Also shown are two read heads HD1, HD2 traversing track 350. The second head leads the first head by a distance 396 in a down track direction. The two read heads are shown at three example cross-track locations 301a, 301b, 301c relative to track 350. In particular, a first cross-track location 301a shows a scenario where the first read head is located a distance 392a from the centerline of track 350 which is less than a second distance 394a from which the second head is located from the centerline of track 350; a second cross-track location 301b shows a scenario where the first read head is located a distance 392b from the centerline of track 350 which is approximately the same as a second distance 394b from which the second head is located from the centerline of track 350; and a third cross-track location 301c shows a scenario where the first read head is located a distance 392c from the centerline of track 350 which is greater than a second distance 394c from which the second head is located from the centerline of track 350. In cross-track location 301a, the second head is more affected by interference from an adjacent track (i.e., track 360) than the first head. In cross-track location 301b, the second head is likely affected by interference from an adjacent track (i.e., track 360) than the first head is affected by interference from another adjacent track (i.e., track 340). In cross-track location 301c, the first head is more affected by interference from an adjacent track (i.e., track 340) than the second head.

Figure 3C:
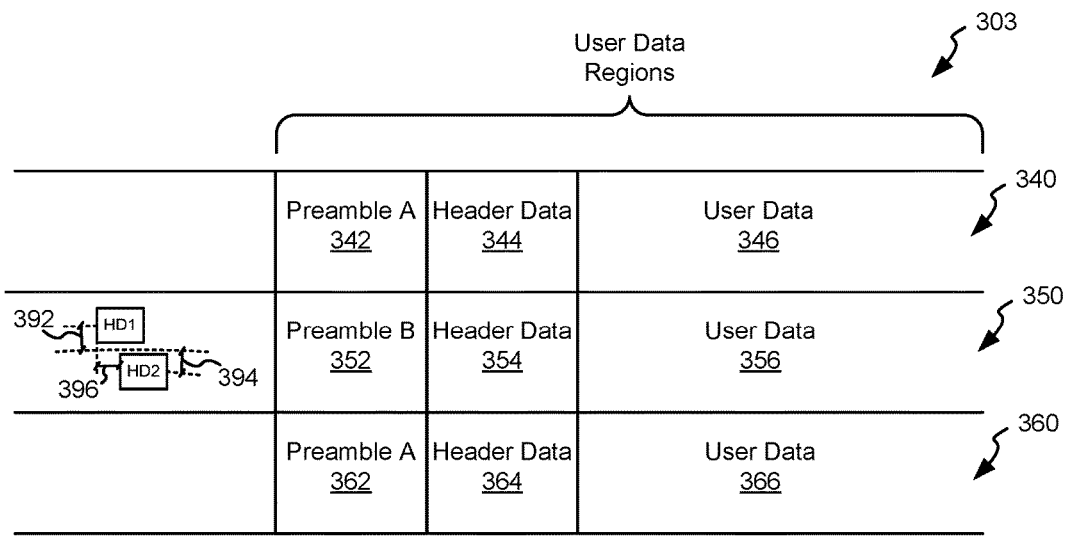

Turning to FIG. 3c, a user data region 303 of the three tracks 340, 350, 360 is shown. Similar to conventional art, each of the user data regions includes a preamble and header data. The preambles alternate between tracks. In particular, track 340 includes a preamble A 342, track 350 includes a preamble B 352, and track 360 repeats the preamble A 362. Preamble A 342 is followed by header data 344 and user data 346; preamble B 352 is followed by header data 354 and user data 356; and preamble A 362 is followed by header data 364 and user data 366.

Preamble A is specifically designed to operate both for synchronization purposes, and also to be unmistakable from preamble B that also serves synchronization purposes. In one particular embodiment of the present invention, preamble B is a 2T preamble (i.e., a pattern that repeats every two periods such as, for example, '00110011'), and preamble A is a non-2T pattern. Such non-2T patterns may include, but are not limited to, a 3T preamble (i.e., a pattern that repeats every three periods such as, for example, '000111000111') or a 2.5T preamble (i.e., a pattern that repeats every two and one half periods such as, for example, '0011100111'). Based upon the disclosure provided herein, one of ordinary skill in the art will recognize various combinations of patterns that may be used for preamble A and preamble B in accordance with different embodiments of the present invention.

Referring again to FIG. 3a, aligned data 318 and aligned data 378 are provided to an ITT mitigating multi-dimensional equalization circuit 399 (shown in dashed lines). ITT mitigating multi-dimensional equalization circuit 399 includes a main head selection circuit 391 that calculates magnitude ratios for each of the first and second read heads using aligned data 318 and aligned data 378. In particular, main head selection circuit 391 calculates the magnitude ratios for the first read head and the second read head in accordance with the following equations $$M_{First\ Head} = \frac{M_{target\ track}}{M_{adjacent\ track}};$$

$$M_{Second\ Head} = \frac{M_{target\ track}}{M_{adjacent\ track}}.$$

Where the target track exhibits a 2T preamble and the adjacent track exhibits a 3T preamble, then $M_{target\ track}$ is the magnitude of the 2T waveform in the aligned data from the respective head, and $M_{adjacent\ track}$ is the magnitude of the 3T waveform in the aligned data from the respective head.

Alternatively, where the target track exhibits a 3T preamble and the adjacent track exhibits a 2T preamble, then $M_{target\ track}$ is the magnitude of the 3T waveform in the aligned data from the respective head and $M_{adjacent\ track}$ is the magnitude of the 2T waveform in the aligned data from the respective head. Where $M_{Second\ Head}$ is greater than $M_{First\ Head}$, then the second read head is selected as the main read head and the first read head is selected as the non-main read head. An indication of the selected main head is provided as a main head indicator output 393. Alternatively, where $M_{Second\ Head}$ is less than $M_{First\ Head}$, then the first read head is selected as the main read head and the second read head is selected as the non-main read head. Again, an indication of the selected main head is provided as a main head indicator output 393.

ITT mitigating multi-dimensional equalization circuit 399 additionally includes a magnitude calculation circuit 351 that calculates the magnitude of various components identifiable in aligned data 318 and aligned data 378. In particular, magnitude calculation circuit 351 calculates the magnitude of the signal from the adjacent track in aligned data 318 when the first read head is at its current location relative to the centerline of the track being read ($a'_{1,M}$ assuming the first read head is selected as the main read head as indicated by main head indicator output 393), the magnitude of the signal from the adjacent track in aligned data 378 when the second read head is at its current location relative to the centerline of the track being read ($a'_{1,N-M}$ assuming the second read head is not selected as the main read head as indicated by main head indicator output 393), the magnitude of the signal from the target track in aligned data 318 when the first read head is at its current location relative to the centerline of the track being read ($a'_{0,M}$ assuming the first read head is selected as the main read head as indicated by main head indicator output 393), and the magnitude of the signal from the target track in aligned data 378 when the second read head is at its current location relative to the centerline of the track being read ($a'_{0,N-M}$ assuming the second read head is not selected as the main read head as indicated by main head indicator output 393). Where, for example, the target track exhibits a 2T preamble and the adjacent track exhibits a 3T preamble; $a'_{1,N-M}$ is the magnitude of the 3T information included in aligned data 378 where the second read head is selected as the non-main read head, $a'_{1,M}$ is the magnitude of the 3T information included in aligned data 318 where the first read head is selected as the main read head; $a'_{0,N-M}$ is the magnitude of the 2T information included in aligned data 378 where the first read head is selected as the main read head; $a'_{0,M}$ is the magnitude of the 2T information included in aligned data 318 where the first read head is selected as the main read head. Alternatively, where, for example, the target track exhibits a 3T preamble and the adjacent track exhibits a 2T preamble; $a'_{1,N-M}$ is the magnitude of the 2T information included in aligned data 378 where the second read head is selected as the non-main read head, $a'_{1,M}$ is the magnitude of the 2T information included in aligned data 318 where the first read head is selected as the main read head; $a'_{0,N-M}$ is the magnitude of the 3T information included in aligned data 378 where the second read head is selected as the non-main read head, $a'_{0,M}$ is the magnitude of the 3T information included in aligned data 318 where the first read head is selected as the main read head. Each of $a'_{1,N-M}$, $a'_{1,M}$, $a'_{0,N-M}$, and $a'_{0,M}$ are provided as a magnitude output 353.

ITT mitigating multi-dimensional equalization circuit 399 additionally includes an equalizer circuit 339 that applies an equalization algorithm to aligned data 318 to yield an interim equalized output 395, and an equalizer circuit 343 that applies an equalization algorithm to aligned data 378 to yield an interim equalized output 397. The equalization algorithm applied by equalizer circuit 339 is governed at least in part by an equalizer coefficient set 349, and the equalization algorithm applied by equalizer circuit 343 is governed at least in part by an equalizer coefficient set 347. In some embodiments of the present inventions, equalizer circuit 343 and equalizer circuit 339 are implemented as digital finite impulse response (DIFR) circuits. Based upon the disclosure provided herein, one of ordinary skill in the art will recognize a variety of implementations of equalizer circuit 343 and equalizer circuit 339 that may be used in relation to different embodiments of the present inventions.

ITT mitigating multi-dimensional equalization circuit 399 additionally includes a reference equalization coefficients memory 335 that stores reference magnitude values that correspond to known locations (e.g., a location where a minimum bit error rate occurs) of the heads relative to the centerline of the track being read. In particular, for each track, reference equalization coefficients memory 335 stores the magnitude ($a_{1,M}$) of the signal from the adjacent track in the readback waveform sensed by the main read head when the main read head is located in a preferred location relative to the centerline of the track being read, and the magnitude ($a_{0,N-M}$) of the signal from the target track in the readback waveform sensed by the non-main read head when the non-main read head is located in a preferred location relative to the centerline of the track being read. Each of $a_{1,M}$ and $a_{0,N-M}$ are provided as a reference output 337. The information maintained in reference equalization coefficients memory 335 may be generated during a manufacturing phase based upon testing different cross-track locations for a head.

ITT mitigating multi-dimensional equalization circuit 399 additionally includes an ITT compensating equalization coefficient adaptation circuit 345 that updates equalizer coefficient set 349 and equalizer coefficient set 347 based upon magnitude output 353 and reference output 337. In particular, ITT compensating equalization coefficient adaptation circuit 345 calculates a mitigation scalar value to adjust the amount of ITT applied depending upon the relative distances of the read heads from centerline of the track being read. Where both of the first read head and the second read head are approximately the same distance from the centerline, the mitigation scalar value is close to zero to effectively disable ITT mitigation. Where one read head is substantially farther from the centerline than the other read head, the mitigation scalar value is close to unity resulting in a full mitigation. Where, on the other hand, the relative distances of the read heads from the centerline are in between approximately equal and substantial, the mitigation scalar value is a middle value resulting in a scaled mitigation. The following pseudocode represents one example of a mitigation scalar value calculation.

If ($|m_{First\ Head} - m_{Second\ Head}|$)<Low Threshold){mitigation scalar=$s_1$}

Else If ($|m_{First\ Head} - m_{Second\ Head}|$)<High Threshold) {mitigation scalar=$s_2$}

Else {mitigation scalar=$s_3$} where, as an example, $S_1$ is equal to zero, $S_2$ is equal to 0.5, and $S_3$ is equal to 1.0. Based upon the disclosure provided herein, one of ordinary skill in the art will recognize a variety of values for the low threshold, the high threshold, and $S_1$, $S_2$, and $S_3$.

In addition, ITT compensating equalization coefficient adaptation circuit 345 calculates an ITT mitigation value (b). The ITT mitigation value may be calculated in accordance with the following equation:

$$b=((a'_{1,M}-a_{1,M})/a'_{1,N-M}),$$

where $a'_{1,M}$ and $a'_{1,N-M}$ are each received as part of magnitude output 353 and $\alpha_{1,M}$ is received as part of reference output 337.

ITT compensating equalization coefficient adaptation circuit 345 updates equalizer coefficient set 347 and equalizer coefficient set 349. Where the first read head is identified by main head indicator output 393 as the main head and the second read head is the non-main head, equalizer coefficient set 349 receives the main equalizer coefficient set discussed below and equalizer coefficient set 347 receives the non-main equalizer coefficient set. Alternatively, where the second read head is identified by main head indicator output 393 as the main head and the first read head is the non-main head, equalizer coefficient set 347 receives the main equalizer coefficient set discussed below and equalizer coefficient set 349 receives the non-main equalizer coefficient set.

The non-main equalizer coefficient set is calculated in accordance with the following equation:

Non-Main Equalizer Coefficient Set=Non-Main Equalizer Reference Coefficient Set−Mitigation Scalar*b*Main Equalizer Reference Coefficient Set, where the Non-Main Equalizer Reference Coefficient Set is the default (i.e., non-ITT mitigated) coefficient set used for the selected non-main equalizer circuit, and the Main Equalizer Reference Coefficient Set is the default (i.e., non-ITT mitigated) coefficient set used for the selected main equalizer circuit. The main equalizer coefficient set is calculated in accordance with the following equation:

Main Equalizer Coefficient Set=Main Equalizer Reference Coefficient Set*($a_{0,M}$/($a'_{0,M}-a_{0,N-M}$*b*Mitigation Scalar)).

These non-main and main coefficient sets are provided to the respective equalizer circuits.

A multi-dimensional equalization combining circuit 341 combines interim equalized output 395 and interim equalized output 397 to yield an overall equalized output 357. The overall equalized output is provided to a backend processing circuit (not shown) that operates to decode and recover data originally stored to the target track. Multi-dimensional equalization combining circuit 341 may be any circuit known in the art for combining two or more equalized outputs into a single equalized outputs. In one particular embodiment of the present inventions, multi-dimensional equalization combining circuit 341 is a non-recursive adder circuit. In other embodiments of the present inventions, multi-dimensional equalization combining circuit 341 is a recursive adder circuit where the output of the recursive adder circuit is fed back for use during, for example, retry operations. Based upon the disclosure provided herein, one of ordinary skill in the art will recognize a variety of combining circuits and/or processes that may be used to implement multi-dimensional equalization combining circuit 341 in accordance with different embodiments of the present invention.

In operation, a read/write head assembly including the first read head and the second read head is positioned over a track on a storage medium to be read. Data 302 is received from the first read head and amplified by preamplifier 304 to yield amplified signal 306. Analog processing is applied by analog front end circuit 308 to yield digital samples 310. In parallel, data 362 is received from the first read head and amplified by preamplifier 364 to yield amplified signal 366. Analog processing is applied by analog front end circuit 368 to yield digital samples 370. Digital samples 370 and digital samples 210 are buffered and aligned with each other to yield aligned data 378 and aligned data 318, respectively.

One of the first read head or the second read head is selected as the main read head based upon the of digital samples 310 and digital samples 370. This involves selecting the one of the first read head or the second read head that is closest to the centerline of the track being read. Selecting the read head that is closest to the centerline of the track may be done by main head selection circuit 391 that calculates a magnitude ratio for each of the read heads, and the read head exhibiting the greater magnitude ratio is selected by main head selection circuit 391 and indicated via main head indicator output 393. In particular, the magnitude ratio for each head is calculated in accordance with the following equations:

$$M_{First\ Head} = \frac{M_{target\ track}}{M_{adjacent\ track}};$$

$$M_{Second\ Head} = \frac{M_{target\ track}}{M_{adjacent\ track}}.$$

For the rest of the discussion pertaining to FIG. 3a, it is assumed that the first read head (i.e., the source of data 302) is selected as the main read head and the second read head (i.e., the source of data 362) is selected as the non-main read head. Where the reverse is the case, the first and second read heads are reversed as to be the non-main and main read heads, respectively.

In parallel, equalizer circuit 339 applies an equalization algorithm to aligned output 318 to yield interim equalized output 395, and equalizer circuit 343 applies an equalization algorithm to aligned output 378 to yield interim equalized output 397. This initial equalization by equalizer circuit 339 is governed by a reference set of equalizer coefficients (i.e., First Equalizer Reference Coefficients or the reference coefficients for equalizer circuit 339) provided as equalizer coefficient set 349 from ITT compensating equalization coefficient adaptation circuit 345; and the initial equalization by equalizer circuit 343 is governed by a reference set of equalizer coefficients (i.e., Second Equalizer Reference Coefficients or the reference coefficients for equalizer circuit 343) provided as equalizer coefficient set 347 from ITT compensating equalization coefficient adaptation circuit 345.

In parallel, magnitudes of the various components in aligned data 318 and aligned data 378 are calculated by magnitude calculation circuit 351 and provided as magnitude output 352. ITT compensating equalization coefficient adaptation circuit 345 calculates a mitigation scalar value based upon the aforementioned magnitude values. This mitigation scalar value is calculated to adjust the amount of ITT applied depending upon the relative distances of the read heads from centerline of the track being read. Where both of the read heads are approximately the same distance from the centerline, the mitigation scalar value is close to zero to effectively disable ITT mitigation. Where one read head is substantially farther from the centerline than the other read head, the mitigation scalar value is close to unity resulting in a full mitigation. Where, on the other hand, the relative distances of the read heads from the centerline are in between approximately equal and substantial, the mitigation scalar value is a middle value resulting in a scaled mitigation. The following pseudocode represents one example of a mitigation scalar value calculation.

If $(|m_{First\ Head} - m_{Second\ Head}|) <$ Low Threshold){mitigation scalar=$s_1$}

Else If $(|m_{First\ Head} - m_{Second\ Head}|) <$ High Threshold) {mitigation scalar=$s_2$}

Else {mitigation scalar=$s_3$} where, as an example, $S_1$ is equal to zero, $S_2$ is equal to 0.5, and $S_3$ is equal to 1.0. Based upon the disclosure provided herein, one of ordinary skill in the art will recognize a variety of values for the low threshold, the high threshold, and $S_1$, $S_2$, and $S_3$.

ITT compensating equalization coefficient adaptation circuit 345 additionally calculates the ITT mitigation value (b) is calculated in accordance with the following equation:

$$b = ((a'_{1,M} - a_{1,M})/a'_{1,N-M}).$$

ITT compensating equalization coefficient adaptation circuit 345 calculates the ITT mitigated coefficients for the non-main equalizer (i.e., equalizer circuit 343 in this example). This computation may be done in accordance with the following equation:

Non-Main ITI Mitigated Coefficients=Second Equalizer Reference Coefficients–Mitigation Scalar*b*First Equalizer Reference Coefficients'

Additionally, ITT mitigated coefficients for the main equalizer (i.e., equalizer circuit 339 in this example) are calculated by ITT compensating equalization coefficient adaptation circuit 345 in accordance with the following equation:

Main ITI Mitigated Coefficients=First Equalizer Reference Coefficients*$(a_{0,M}/(a'_{0,M} - a_{0,N-M}*b*$Mitigation Scalar)).

The main head equalizer circuit (i.e., equalizer circuit 339 in this example) is updated to utilize the main ITT mitigated coefficients, and the non-main head equalizer circuit (i.e., equalizer circuit 343 in this example) is updated to utilize the non-main ITT mitigated coefficients.

Figure 4:
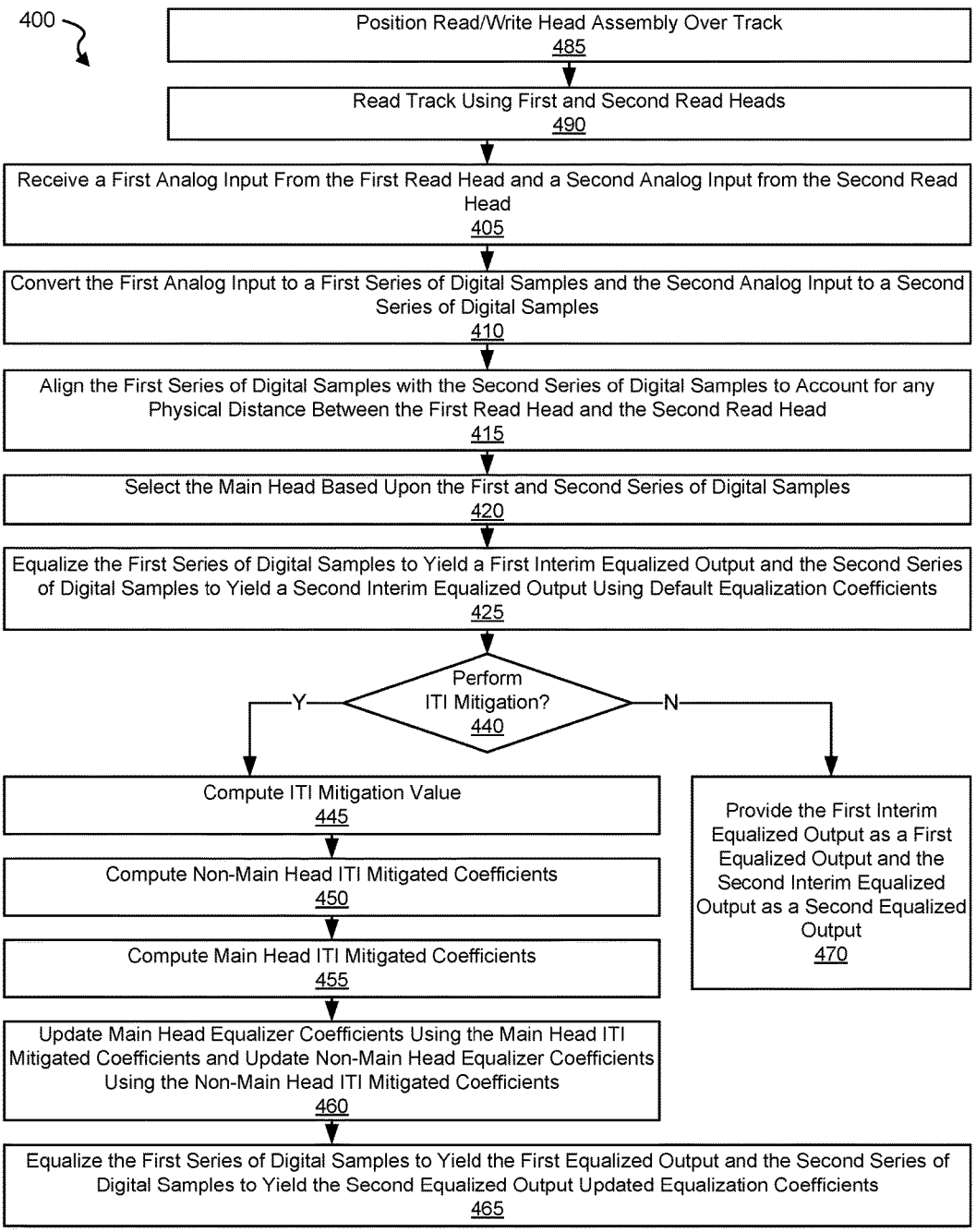
FIG. 4 is a flow diagram showing a method for ITI compensating equalization in accordance with various embodiments of the present inventions.

Turning to FIG. 4, a flow diagram 400 shows a method for ITT compensating equalization in accordance with various embodiments of the present inventions. Following flow diagram 400, a read/write head assembly is positioned over a track to be read (block 485). The read/write head assembly includes two or more read heads that are disposed at different locations over the track. As just some examples, the read heads may be disposed: at location 301a where the first read head is nearer the center line of the track than the second read head, at location 301b where the first read head and the second read head are located approximately the same distance from the center line of the track than the second read head, at location 301c where the second read head is nearer to the center line of the track than the first read head. The track is then read as the read heads fly over the track where each of the first sensor and second sensor sensing information on the track (block 490). This includes sensing magnetic information from the track by each of the read heads. This process yields a first signal derived from the first read head and a second signal derived from the second read head.

Analog processing is applied to the first signal to yield a first analog input and to the second signal to yield a second analog input. The analog processing may include, but is not limited to, analog filtering. The first analog input corresponding to the first read head and the second analog input corresponding to the second read head are received (block 405). The first analog input is processed including conversion to a first series of digital samples, and the second analog input is processed including conversion to a second series of digital samples (block 410). Any analog to digital conversion circuit known in the art may be used in relation to different embodiments of the present inventions. An alignment is performed to align the first series of digital samples with the second series of digital samples to account for any down-track physical separation between the first read head and the second read head on the read/write head assembly (block 415). This alignment may be done, for example, using one or more digital interpolation filter circuits where the digital interpolation is applied to either or both of the first series of digital samples and the second series of digital samples.

One of the first read head or the second read head is selected as the main read head based upon the first series of digital samples and the second series of digital samples (block 420). This involves selecting the one of the first read head or the second read head that is closest to the centerline of the track being read. Selecting the read head that is closest to the centerline of the track may be done by calculating a power ratio for each of the heads, and the head exhibiting the greater power ratio is identified as the main read head and the other head is identified as a non-main read head. In particular, the power ratio for each head is calculated in accordance with the following equations:

$$P_{First\ Head} = \frac{P_{target\ track}}{P_{adjacent\ track}};$$

$$P_{Second\ Head} = \frac{P_{target\ track}}{P_{adjacent\ track}}.$$

Where the target track exhibits a 2T preamble and the adjacent track exhibits a 3T preamble, then $P_{target\ track}$ is the 2T power in the readback signal and $P_{adjacent\ track}$ is the 3T power in the readback signal. Alternatively, where the target track exhibits a 3T preamble and the adjacent track exhibits a 2T preamble, then $P_{target\ track}$ is the 3T power in the readback signal and $P_{adjacent\ track}$ is the 2T power in the readback signal. Where $P_{Second\ Head}$ is greater than $P_{First\ Head}$, then the second read head is selected as the main read head and the first read head is selected as the non-main read head. Alternatively, where $P_{Second\ Head}$ is less than $P_{First\ Head}$, then the first read head is selected as the main read head and the second read head is selected as the non-main read head. Alternatively, the aforementioned power calculations may be replaced with magnitude calculations based upon the following equations:

$$M_{First\ Head} = \frac{M_{target\ track}}{M_{adjacent\ track}};$$

$$M_{Second\ Head} = \frac{M_{target\ track}}{M_{adjacent\ track}}.$$

Where the target track exhibits a 2T preamble and the adjacent track exhibits a 3T preamble, then $M_{target\ track}$ is the magnitude of the 2T waveform in the readback signal and $M_{adjacent\ track}$ is the magnitude of the 3T waveform in the readback signal. Alternatively, where the target track exhibits a 3T preamble and the adjacent track exhibits a 2T preamble, then $M_{target\ track}$ is the magnitude of the 3T waveform in the readback signal and $M_{adjacent\ track}$ is the magnitude of the 2T waveform in the readback signal. Where $M_{Second\ Head}$ is greater than $M_{First\ Head}$, then the second read head is selected as the main read head and the first read head is selected as the non-main read head. Alternatively, where $M_{Second\ Head}$ is less than $M_{First\ Head}$, then the first read head is selected as the main read head and the second read head is selected as the non-main read head. Such a process of selecting a main read head may be done using head locating circuitry and/or methods similar to those disclosed in U.S. patent application Ser. No. 14/836,905 entitled "Systems and Methods for Track Mis-Registration and Mitigation", and filed Aug. 26, 2015 by Zheng et al. The entirety of the aforementioned reference is incorporated herein by reference for all purposes.

An equalization algorithm is applied to the first series of digital samples to yield a first interim equalized output, and the equalization algorithm is applied to the second series of digital samples to yield a second interim equalized output (block 425). A first equalization circuit applies the equalization to the first series of digital samples using a first reference set of equalizer coefficients (i.e., First Equalizer Reference Coefficients), and a second equalization circuit applies the equalization to the second series of digital samples using a second reference set of equalizer coefficients (i.e., Second Equalizer Reference Coefficients).

It is determined whether ITI mitigation is to be performed (block 440). Where only one track adjacent to the target track being read is considered, whether or not ITI mitigation is to be performed is based upon a user selection. Alternatively, where both tracks adjacent to the target track are being considered, whether or not ITI mitigation is to be performed is based upon the relative distance the first read head and the second read head are from the centerline of the track. Thus, for example, where the first read head and the second read head are approximately the same distance from the centerline of the target track, no ITI mitigation is to be performed. In contrast, where the main read head is much closer to the centerline of the target track than the non-main read head is to the centerline, then ITI mitigation is performed.

Where ITI mitigation is not performed (block 440), the first interim equalized output is provided as a first equalized output and the second interim equalized output is provided as a second equalized output (block 470). The first equalized output and the second equalized output are provided to a multi-dimensional equalization circuit where they are unified into an overall equalized output. The overall equalized output is provided to a backend processing circuit (not shown) that operates to decode and recover data originally stored to the target track.

Alternatively, where ITI mitigation is not performed (block 440), an ITI mitigation value is calculated (block 445). The ITI mitigation value (b) is calculated in accordance with the following equation:

$$b = ((a'_{1,M} - a_{1,M})/a'_{1,N-M});$$

where $a_{1,M}$ the magnitude of the signal from the adjacent track in the readback waveform sensed by the main read head when the main read head is located in a preferred location relative to the centerline of the track being read, $a'_{1,M}$ is the magnitude of the signal from the adjacent track in the readback waveform sensed by the main read head when the main read head is at its current location relative to the centerline of the track being read, and $a'_{1,N-M}$ is the magnitude of the signal from the adjacent track in the readback waveform sensed by the non-main read head when the non-main read head is at its current location relative to the centerline of the track being read. $a_{1,M}$ is accessed from a reference memory which is loaded with pre-calculated reference values for each track, where the reference values are defined as the location having the lowest bit error rate. $a'_{1,M}$ and $a'_{1,N-M}$ are calculated based upon the first series of digital samples and the second series of digital samples. Where the target track exhibits a 2T preamble and the adjacent tracks exhibit 3T preambles, $a'_{1,M}$ is calculated as the magnitude of the signal corresponding to the 3T preamble in the readback signal derived from the main read head and $a'_{1,N-M}$ is calculated as the magnitude of the signal corresponding to the 3T preamble in the readback signal derived from the non-main read head. Alternatively, where the target track exhibits a 3T preamble and the adjacent tracks exhibit 2T preambles, $a'_{1,M}$ is calculated as the magnitude of the signal corresponding to the 2T preamble in the readback signal derived from the main read head and $a'_{1,N-M}$ is calculated as the magnitude of the signal corresponding to the 2T preamble in the readback signal derived from the non-main read head.

Using the ITT mitigation value, ITT mitigated coefficients for the non-main equalizer are calculated (block 450). This computation may be done in accordance with the following equation:

Non-Main ITI Mitigated Coefficients=Second Equalizer Reference Coefficients$-b*$First Equalizer Reference Coefficients, where the first equalizer is the main equalizer and the second equalizer is the non-main equalizer. Where, on the other hand, the second equalizer is the main equalizer, the first and second equalizer reference coefficients are interchanged in the equation above. Additionally, ITT mitigated coefficients for the main equalizer are calculated (block 455).

Main ITI Mitigated Coefficients=First Equalizer Reference Coefficients$*(a_{0,M}/(a'_{0,M} - a_{0,N-M}*b))$, where $a_{0,N-M}$ is the magnitude of the signal from the target track in the readback waveform sensed by the non-main read head when the non-main read head is located in a preferred location relative to the centerline of the track being read, and $a'_{0,M}$ and $a'_{0,N-M}$ are calculated based upon the first series of digital samples and the second series of digital samples. Where the target track exhibits a 3T preamble and the adjacent tracks exhibit 2T preambles, $a_{0,M}$ is calculated as the magnitude of the signal corresponding to the 3T preamble in the readback signal derived from the main read head and $a'_{0,N-M}$ is calculated as the magnitude of the signal corresponding to the 3T preamble in the readback signal derived from the non-main read head. Alternatively, where the target track exhibits a 2T preamble and the adjacent tracks exhibit 3T preambles, $a'_{0,M}$ is calculated as the magnitude of the signal corresponding to the 2T preamble in the readback signal derived from the main read head and a'$_{0,N-M}$ is calculated as the magnitude of the signal corresponding to the 2T preamble in the readback signal derived from the non-main read head.

The main head equalizer circuit is updated to utilize the main ITT mitigated coefficients, and the non-main head equalizer circuit is updated to utilize the non-main ITT mitigated coefficients (block 460). Thus, where the first read head is selected as the main read head and the second read head is selected as the non-main read head, the equalizer circuit associated with the first read head is updated to use the main ITT mitigated coefficients and the equalizer circuit associated with the second read head is updated to use the non-main ITT mitigated coefficients. Alternatively, where the second read head is selected as the main read head and the first read head is selected as the non-main read head, the equalizer circuit associated with the second read head is updated to use the main ITT mitigated coefficients and the equalizer circuit associated with the first read head is updated to use the non-main ITT mitigated coefficients.

The equalization algorithm is applied to the first series of digital samples to yield the first equalized output using the first equalizer circuit governed by the aforementioned updated ITT mitigated coefficients corresponding to the first equalizer circuit, and the equalization algorithm is applied to the second series of digital samples to yield the second equalized output using the second equalizer circuit governed by the aforementioned updated ITT mitigated coefficients corresponding to the second equalizer circuit (block 465). The first equalized output and the second equalized output are provided to a multi-dimensional equalization circuit where they are unified into an overall equalized output. The overall equalized output is provided to a backend processing circuit (not shown) that operates to decode and recover data originally stored to the target track.

Figure 5:
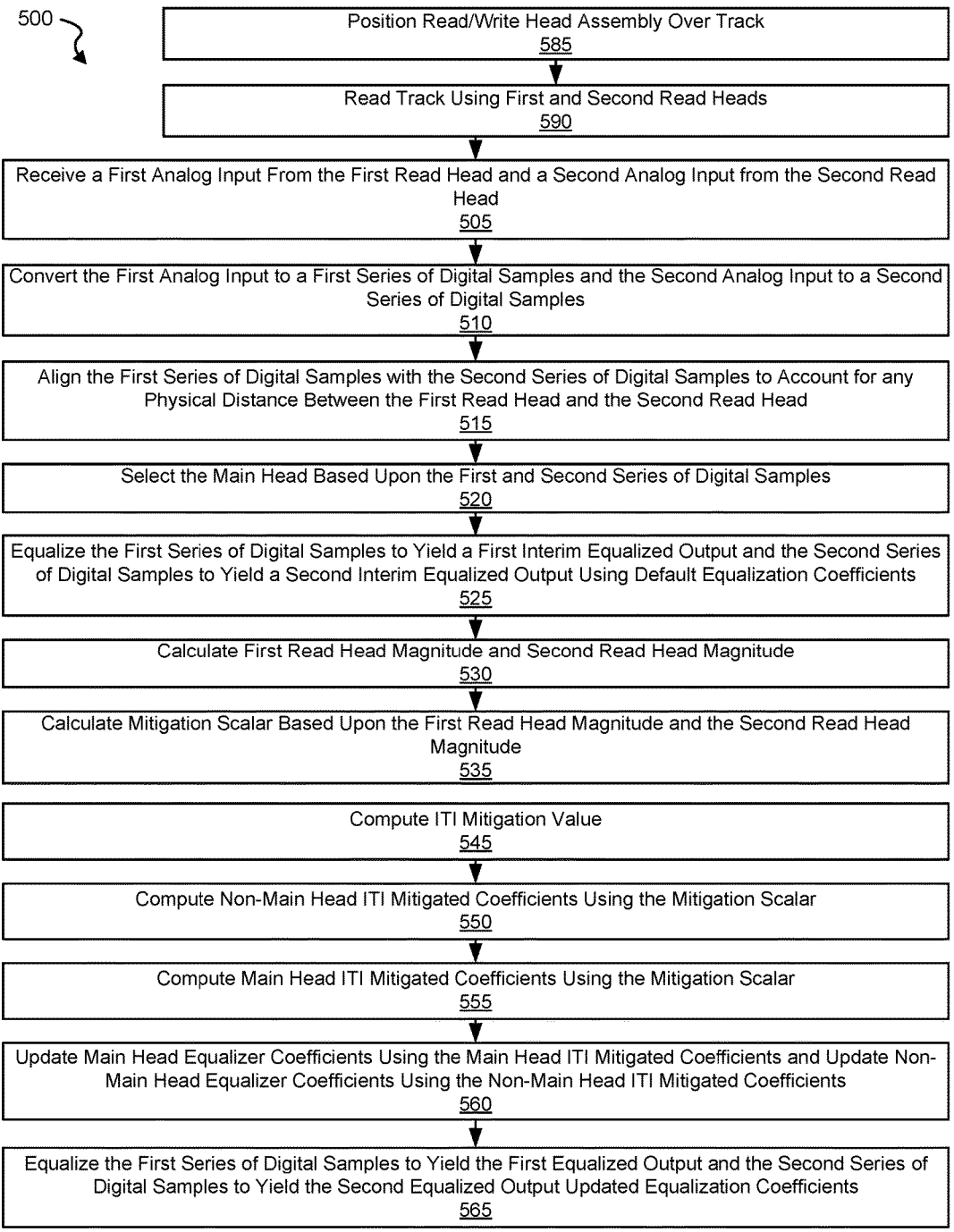
FIG. 5 is a flow diagram showing a method for ITT compensating equalization in accordance with other embodiments of the present inventions.

Turning to FIG. 5, a flow diagram 500 shows a method for ITT compensating equalization in accordance with other embodiments of the present inventions. Following flow diagram 500, a read/write head assembly is positioned over a track to be read (block 585). The read/write head assembly includes two or more read heads that are disposed at different locations over the track. As just some examples, the read heads may be disposed: at location 301a where the first read head is nearer the center line of the track than the second read head, at location 301b where the first read head and the second read head are located approximately the same distance from the center line of the track than the second read head, at location 301c where the second read head is nearer to the center line of the track than the first read head. The track is then read as the read heads fly over the track where each of the first sensor and second sensor sensing information on the track (block 590). This includes sensing magnetic information from the track by each of the read heads. This process yields a first signal derived from the first read head and a second signal derived from the second read head.

Analog processing is applied to the first signal to yield a first analog input and to the second signal to yield a second analog input. The analog processing may include, but is not limited to, analog filtering. The first analog input corresponding to the first read head and the second analog input corresponding to the second read head are received (block 505). The first analog input is processed including conversion to a first series of digital samples, and the second analog input is processed including conversion to a second series of digital samples (block 510). Any analog to digital conversion circuit known in the art may be used in relation to different embodiments of the present inventions. An alignment is performed to align the first series of digital samples with the second series of digital samples to account for any down-track physical separation between the first read head and the second read head on the read/write head assembly (block 515). This alignment may be done, for example, using one or more digital interpolation filter circuits where the digital interpolation is applied to either or both of the first series of digital samples and the second series of digital samples.

One of the first read head or the second read head is selected as the main read head based upon the first series of digital samples and the second series of digital samples (block 520). This involves selecting the one of the first read head or the second read head that is closest to the centerline of the track being read. Selecting the read head that is closest to the centerline of the track may be done by calculating a power ratio for each of the heads, and the head exhibiting the greater power ratio is identified as the main read head and the other head is identified as a non-main read head. In particular, the power ratio for each head is calculated in accordance with the following equations:

$$P_{First\ Head} = \frac{P_{target\ track}}{P_{adjacent\ track}};$$

$$P_{Second\ Head} = \frac{P_{target\ track}}{P_{adjacent\ track}}.$$

Where the target track exhibits a 2T preamble and the adjacent track exhibits a 3T preamble, then $P_{target\ track}$ is the 2T power in the readback signal and $P_{adjacent\ track}$ is the 3T power in the readback signal. Alternatively, where the target track exhibits a 3T preamble and the adjacent track exhibits a 2T preamble, then $P_{target\ track}$ is the 3T power in the readback signal and $P_{adjacent\ track}$ is the 2T power in the readback signal. Where $P_{Second\ Head}$ is greater than $P_{First\ Head}$, then the second read head is selected as the main read head and the first read head is selected as the non-main read head. Alternatively, where $P_{Second\ Head}$ is less than $P_{First\ Head}$, then the first read head is selected as the main read head and the second read head is selected as the non-main read head. Alternatively, the aforementioned power calculations may be replaced with magnitude calculations based upon the following equations:

$$M_{First\ Head} = \frac{M_{target\ track}}{M_{adjacent\ track}};$$

$$M_{Second\ Head} = \frac{M_{target\ track}}{M_{adjacent\ track}}.$$

Where the target track exhibits a 2T preamble and the adjacent track exhibits a 3T preamble, then $M_{target\ track}$ is the magnitude of the 2T waveform in the readback signal and $M_{adjacent\ track}$ is the magnitude of the 3T waveform in the readback signal. Alternatively, where the target track exhibits a 3T preamble and the adjacent track exhibits a 2T preamble, then $M_{target\ track}$ is the magnitude of the 3T waveform in the readback signal and $M_{adjacent\ track}$ is the magnitude of the 2T waveform in the readback signal. Where $M_{Second\ Head}$ is greater than $M_{First\ Head}$, then the second read head is selected as the main read head and the first read head is selected as the non-main read head. Alternatively, where $M_{Second\ Head}$ is less than $M_{First\ Head}$, then the first read head is selected as the main read head and the second read head is selected as the non-main read head. Such a process of selecting a main read head may be done using head locating circuitry and/or methods similar to those disclosed in U.S. patent application Ser. No. 14/836,905 entitled "Systems and Methods for Track Mis-Registration and Mitigation", and filed Aug. 26, 2015 by Zheng et al. The entirety of the aforementioned reference was previously incorporated herein by reference for all purposes.

An equalization algorithm is applied to the first series of digital samples to yield a first interim equalized output, and the equalization algorithm is applied to the second series of digital samples to yield a second interim equalized output (block 525). A first equalization circuit applies the equalization to the first series of digital samples using a first reference set of equalizer coefficients (i.e., First Equalizer Reference Coefficients), and a second equalization circuit applies the equalization to the second series of digital samples using a second reference set of equalizer coefficients (i.e., Second Equalizer Reference Coefficients).

A first read head magnitude and a second read head magnitude are calculated (block 530). The first read head magnitude and the second read head magnitude may be calculated as the magnitude of the adjacent track signal sensed by the first read head (i.e., $m_{First\ Head}=a'_{1,1}$), and the magnitude of the adjacent track signal sensed by the second read head (i.e., $m_{Second\ Head}=a'_{1,2}$). Where the target track exhibits a 2T preamble and the adjacent tracks exhibit 3T preambles, the aforementioned magnitude calculations may be written as follows:

$$m_{First\ Head}=a'_{3T,1};\text{ and}$$

$$m_{Second\ Head}=a'_{3T,2}$$

where $a'_{3T,1}$ is the magnitude of the 3T preamble in the readback signal derived from the first read head, and $a'_{3T,2}$ is the magnitude of the 3T preamble in the readback signal derived from the second read head. Alternatively, Where the target track exhibits a 3T preamble and the adjacent tracks exhibit 2T preambles, the aforementioned magnitude calculations may be written as follows:

$$m_{First\ Head}=a'_{2T,1};\text{ and}$$

$$m_{Second\ Head}=a'_{2T,2}$$

where $a'_{2T,1}$ is the magnitude of the 2T preamble in the readback signal derived from the first read head, and $a'_{2T,2}$ is the magnitude of the 2T preamble in the readback signal derived from the second read head.

A mitigation scalar value is calculated based upon the aforementioned magnitude values (block 535). This mitigation scalar value is calculated to adjust the amount of ITT applied depending upon the relative distances of the read heads from centerline of the track being read. Where both of the read heads are approximately the same distance from the centerline, the mitigation scalar value is close to zero to effectively disable ITT mitigation. Where one read head is substantially farther from the centerline than the other read head, the mitigation scalar value is close to unity resulting in a full mitigation. Where, on the other hand, the relative distances of the read heads from the centerline are in between approximately equal and substantial, the mitigation scalar value is a middle value resulting in a scaled mitigation. The following pseudocode represents one example of a mitigation scalar value calculation.

If $(|m_{First\ Head} - m_{Second\ Head}|)$<Low Threshold>{mitigation scalar=$s_1$}

Else If $(|m_{First\ Head} - m_{Second\ Head}|)$<High Threshold) {mitigation scalar=$s_2$}

Else {mitigation scalar=$s_3$} where, as an example, $S_1$ is equal to zero, $S_2$ is equal to 0.5, and $S_3$ is equal to 1.0. Based upon the disclosure provided herein, one of ordinary skill in the art will recognize a variety of values for the low threshold, the high threshold, and $S_1$, $S_2$, and $S_3$.

An ITT mitigation value is calculated (block 545). The ITT mitigation value (b) is calculated in accordance with the following equation:

$$b=((a'_{1,M}-a_{1,M})/a'_{1,N-M});$$

where $a_{1,M}$ is the magnitude of the signal from the adjacent track in the readback waveform sensed by the main read head when the main read head is located in a preferred location relative to the centerline of the track being read, $a'_{1,M}$ is the magnitude of the signal from the adjacent track in the readback waveform sensed by the main read head when the main read head is at its current location relative to the centerline of the track being read, and $a'_{1,N-M}$ is the magnitude of the signal from the adjacent track in the readback waveform sensed by the non-main read head when the non-main read head is at its current location relative to the centerline of the track being read. $a_{1,M}$ is accessed from a reference memory which is loaded with pre-calculated reference values for each track, where the reference values are defined as the location having the lowest bit error rate. $a'_{1,M}$ and $a'_{1,N-M}$ are calculated based upon the first series of digital samples and the second series of digital samples. Where the target track exhibits a 2T preamble and the adjacent tracks exhibit 3T preambles, $a'_{1,M}$ is calculated as the magnitude of the signal corresponding to the 2T preamble in the readback signal derived from the main read head and $a'_{1,N-M}$ is calculated as the magnitude of the signal corresponding to the 2T preamble in the readback signal derived from the non-main read head. Alternatively, where the target track exhibits a 3T preamble and the adjacent tracks exhibit 2T preambles, $a'_{1,M}$ is calculated as the magnitude of the signal corresponding to the 3T preamble in the readback signal derived from the main read head and $a'_{1,N-M}$ is calculated as the magnitude of the signal corresponding to the 3T preamble in the readback signal derived from the non-main read head.

Using the ITT mitigation value, ITT mitigated coefficients for the non-main equalizer are calculated (block 550). This computation may be done in accordance with the following equation:

Non-Main ITI Mitigated Coefficients=Second Equalizer Reference Coefficients−Mitigation Scalar*$b$*First Equalizer Reference Coefficients, where the first equalizer is the main equalizer and the second equalizer is the non-main equalizer. Where, on the other hand, the second equalizer is the main equalizer, the first and second equalizer reference coefficients are interchanged in the equation above. Additionally, ITI mitigated coefficients for the main equalizer are calculated (block 455).

Main ITI Mitigated Coefficients=First Equalizer Reference Coefficients*($a_{0,M}$/($a'_{0,M}$–$a_{0,N-M}$*b*Mitigation Scalar)), where $a'_{0,M}$ and $a'_{0,N-M}$ are calculated based upon the first series of digital samples and the second series of digital samples. Where the target track exhibits a 2T preamble and the adjacent tracks exhibit 3T preambles, $a'_{0,M}$ is calculated as the magnitude of the signal corresponding to the 3T preamble in the readback signal derived from the main read head and $a'_{0,N-M}$ is calculated as the magnitude of the signal corresponding to the 3T preamble in the readback signal derived from the non-main read head. Alternatively, where the target track exhibits a 2T preamble and the adjacent tracks exhibit 3T preambles, $a'_{0,M}$ is calculated as the magnitude of the signal corresponding to the 2T preamble in the readback signal derived from the main read head and $a'_{0,N-M}$ is calculated as the magnitude of the signal corresponding to the 2T preamble in the readback signal derived from the non-main read head.

The main head equalizer circuit is updated to utilize the main ITI mitigated coefficients, and the non-main head equalizer circuit is updated to utilize the non-main ITI mitigated coefficients (block 560). Thus, where the first read head is selected as the main read head and the second read head is selected as the non-main read head, the equalizer circuit associated with the first read head is updated to use the main ITI mitigated coefficients and the equalizer circuit associated with the second read head is updated to use the non-main ITI mitigated coefficients. Alternatively, where the second read head is selected as the main read head and the first read head is selected as the non-main read head, the equalizer circuit associated with the second read head is updated to use the main ITI mitigated coefficients and the equalizer circuit associated with the first read head is updated to use the non-main ITI mitigated coefficients.

The equalization algorithm is applied to the first series of digital samples to yield the first equalized output using the first equalizer circuit governed by the aforementioned updated ITI mitigated coefficients corresponding to the first equalizer circuit, and the equalization algorithm is applied to the second series of digital samples to yield the second equalized output using the second equalizer circuit governed by the aforementioned updated rn mitigated coefficients corresponding to the second equalizer circuit (block 565). The first equalized output and the second equalized output are provided to a multi-dimensional equalization circuit where they are unified into an overall equalized output. The overall equalized output is provided to a backend processing circuit (not shown) that operates to decode and recover data originally stored to the target track.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent—albeit such a system would not be a circuit as that term is used herein. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. For example, while the discussion above is directed at the situation where the cross track separation is greater than or equal to zero, head 1 and head 2 are swapped for calculation purposes and then the absolute value of the cross track separation is used. Therefore, the above description should not be taken as limiting the scope of the invention, which is defined by the appended claims.

What is claimed is:

1. A storage device access system, the system comprising:
   a storage medium including at least a target track disposed by an adjacent track;
   a read/write head assembly disposed relative to the storage medium, wherein the read/write head assembly includes at least a first read head sensor and a second read head sensor;
   an equalization circuit including:
      a first equalizer circuit operable to equalize a first data set derived from the first read head sensor that senses information from the target track based upon a first coefficient set;
      a second equalizer circuit operable to equalize a second data set derived from the second read head sensor that senses information from the target track based upon a second coefficient set; and
      an inter-track interference compensation circuit operable to update the first coefficient set using a first update algorithm and the second coefficient set using a second update algorithm to mitigate inter-track interference from the adjacent track, wherein the first update algorithm is different from the second update algorithm.

2. The storage device of claim 1, wherein the equalization circuit further comprises:
   a main head selection circuit operable to identify one of the first read head sensor or the second read head sensor as closer to a centerline of the target track; and
   wherein the first update algorithm is selected based upon a determination that the first read head sensor is closer to the centerline of the target track.

3. The storage device of claim 2, wherein the inter-track compensation circuit is further operable to calculate a mitigation value, and wherein both the first update algorithm and the second update algorithm use the mitigation value.

4. The storage device of claim 3, wherein the first update algorithm is implemented by a circuit applying the following equation:

First Coefficient Sets=First Equalizer Reference Coefficients*($a_{0,M}$/($a'_{0,M}$–$a_{0,N-M}$*mitigation value)), where: $a_{0,M}$ is a reference magnitude of a non-interference signal in the first data set when the first read head sensor is at a reference location relative to the centerline of the target track, $a_{0,N-M}$ is a reference magnitude of a non-interference signal in the second data set when the second read head sensor is at a reference location relative to the centerline of the target track, and $a'_{0,M}$ is a calculated magnitude of a non-interference signal in the first data set, and the first equalizer reference coefficients are an initial set of the first coefficient set.

5. The storage device of claim 3, wherein the second update algorithm is implemented by a circuit applying the following equation:

Second Coefficient Sets=Second Equalizer Reference Coefficients−mitigation value*First Equalizer Reference Coefficients, where: the first equalizer reference coefficients are an initial set of the first coefficient set, and the second equalizer reference coefficients are an initial set of the second coefficient set.

6. The storage device of claim 3, wherein the inter-track compensation circuit is further operable to calculate a mitigation value in accordance with the following equation:

mitigation value=$((a'_{1,M}-a_{1,M})/a'_{1,N-M})$, where: $a_{1,M}$ is a reference magnitude of an interference signal in the first data set when the first read head sensor is at a reference location relative to the centerline of the target track, $a'_{1,M}$ is a calculated magnitude of a first adjacent track interference signal in the first data set, and $a'_{1,N-M}$ is a calculated magnitude of a second adjacent track interference signal in the second data set.

7. The storage device of claim 3, wherein the inter-track interference compensation circuit is further operable to determine a scalar applicable to the mitigation value.

8. The storage device of claim 7, wherein:
when a first distance of the first read head sensor from the centerline of the target track is less than a second distance of the second read head sensor from the centerline of the target track by more than a first threshold, a first scalar value is selected as the scalar; and
when the first distance of the first read head sensor from the centerline of the target track is less than a second distance of the second read head sensor from the centerline of the target track by less than the first threshold, a second scalar value is selected as the scalar.

9. The storage device of claim 7, wherein the first update algorithm is implemented by a circuit applying the following equation:

First Coefficient Sets=First Equalizer Reference Coefficients*$(a_{0,M}/(a'_{0,M}-a_{0,N-M}$*mitigation value*scalar)), where: $a_{0,M}$ is a reference magnitude of a non-interference signal in the first data set when the first read head sensor is at a reference location relative to the centerline of the target track, $a_{0,N-M}$ is a reference magnitude of a non-interference signal in the second data set when the second read head sensor is at a reference location relative to the centerline of the target track, and $a_{0,M}$ is a calculated magnitude of a non-interference signal in the first data set, and the first equalizer reference coefficients are an initial set of the first coefficient set.

10. The storage device of claim 7, wherein the second update algorithm is implemented by a circuit applying the following equation:

Second Coefficient Sets=Second Equalizer Reference Coefficients−mitigation value*First Equalizer Reference Coefficients, where: the first equalizer reference coefficients are an initial set of the first coefficient set, and the second equalizer reference coefficients are an initial set of the second coefficient set.

11. An equalization system, the system comprising:
a first equalizer circuit operable to equalize based upon a first coefficient set a first data set derived from a first read head sensing information from a target track, wherein the target track is near an adjacent track;
a second equalizer circuit operable to equalize based upon a second coefficient set a second data set derived from a second read head sensing information from the target track; and
an inter-track interference compensation circuit operable to update the first coefficient set and the second coefficient set to mitigate inter-track interference from the adjacent track, wherein the inter-track interference compensation circuit updates the first coefficient set using a first update algorithm and updates the second coefficient set using a second update algorithm, and wherein the first update algorithm is different from the second update algorithm.

12. The system of claim 11, wherein the system is implemented as part of a storage device.

13. The system of claim 11, wherein the system is implemented as part of an integrated circuit.

14. The system of claim 11, wherein the system further comprises:
a main head selection circuit operable to identify one of the first read head or the second read head as closer to a centerline of the target track; and
wherein the first update algorithm is selected based upon a determination that the first read head is closer to the centerline of the target track.

15. The system of claim 14, wherein the inter-track compensation circuit is further operable to calculate a mitigation value, and wherein both the first update algorithm and the second update algorithm use the mitigation value.

16. The system of claim 15, wherein the first update algorithm is implemented by a circuit applying the following equation:

First Coefficient Sets=First Equalizer Reference Coefficients*$(a_{0,M}/(a'_{0,M}$*mitigation value)), where: $a_{0,M}$ is a reference magnitude of a non-interference signal in the first data set when the first read head is at a reference location relative to the centerline of the target track, $a_{0,N-M}$ is a reference magnitude of a non-interference signal in the second data set when the second read head is at a reference location relative to the centerline of the target track, and $a'_{0,M}$ is a calculated magnitude of a non-interference signal in the first data set, and the first equalizer reference coefficients are an initial set of the first coefficient set.

17. The system of claim 15, wherein the second update algorithm is implemented by a circuit applying the following equation:

Second Coefficient Sets=Second Equalizer Reference Coefficients−mitigation value*First Equalizer Reference Coefficients, where: the first equalizer reference coefficients are an initial set of the first coefficient set, and the second equalizer reference coefficients are an initial set of the second coefficient set.

18. The system of claim 15, wherein the inter-track compensation circuit is further operable to calculate a mitigation value in accordance with the following equation:

$$\text{mitigation value} = ((a_{1,M} - a_{1,M})/a'_{1,N-M}),$$

where: $a_{1,M}$ is a reference magnitude of an interference signal in the first data set when the first read head is at a reference location relative to the centerline of the target track, $a'_{1,M}$ is a calculated magnitude of a first adjacent track interference signal in the first data set, and $a'_{1,N-M}$ is a calculated magnitude of a second adjacent track interference signal in the second data set.

19. A method for mitigating inter-track interference, the method comprising:
 applying a first equalization by a first equalization circuit using a first coefficient set to a first data set derived from a first read head sensing information from a target track to yield a first equalized output, wherein the target track is near an adjacent track;
 applying a second equalization by a second equalization circuit using a second coefficient set to a second data set derived from a second read head sensing information from the target track to yield a second equalized output;
 identifying one of the first read head or the second read head as closer to a centerline of the target track; and
 updating the first coefficient set and the second coefficient set to mitigate inter-track interference from the adjacent track, wherein updating the first coefficient set is done in accordance with a first update algorithm and updating the second coefficient set is done in accordance with a second update algorithm, and wherein the first update algorithm is different from the second update algorithm and is selected based upon a determination that the first read head is closer to the centerline of the target track.

20. The method of claim 19, the method further comprising:
 calculating a mitigation value, wherein both the first update algorithm and the second update algorithm use the mitigation value.

\* \* \* \* \*